(12) United States Patent
Ashbrook et al.

(10) Patent No.: US 9,105,163 B2
(45) Date of Patent: Aug. 11, 2015

(54) METHODS, APPARATUSES, AND COMPUTER PROGRAM PRODUCTS FOR ASSOCIATING NOTIFICATIONS WITH ALERT FUNCTIONS OF REMOTE DEVICES

(75) Inventors: Daniel L. Ashbrook, Sunnyvale, CA (US); David H. Nguyen, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 336 days.

(21) Appl. No.: 13/537,575

(22) Filed: Jun. 29, 2012

(65) Prior Publication Data

US 2014/0002261 A1    Jan. 2, 2014

(51) Int. Cl.
*G08B 6/00* (2006.01)
*H04M 19/04* (2006.01)

(52) U.S. Cl.
CPC ...... *G08B 6/00* (2013.01); *H04M 19/04* (2013.01)

(58) Field of Classification Search
None
See application file for complete search history.

(56) References Cited

U.S. PATENT DOCUMENTS

| | | | |
|---|---|---|---|
| 6,532,360 B1 * | 3/2003 | Shaffer ................ | 455/404.1 |
| 7,130,664 B1 * | 10/2006 | Williams ................ | 455/567 |
| 7,792,552 B2 | 9/2010 | Thomas et al. | |
| 8,077,026 B2 * | 12/2011 | Jobe et al. ................ | 340/506 |
| 2004/0266348 A1 | 12/2004 | Deshpande et al. | |
| 2007/0087790 A1 | 4/2007 | Worick et al. | |
| 2007/0273506 A1 * | 11/2007 | Butler .................. | 340/539.18 |
| 2008/0218309 A1 * | 9/2008 | Steenstra et al. ....... | 340/5.8 |
| 2008/0293453 A1 | 11/2008 | Atlas et al. | |
| 2009/0028179 A1 * | 1/2009 | Albal ................. | 370/465 |
| 2009/0203349 A1 * | 8/2009 | Hollstien ............... | 455/404.1 |
| 2012/0030379 A1 * | 2/2012 | Won et al. ............ | 710/8 |
| 2012/0069131 A1 * | 3/2012 | Abelow ............... | 348/14.01 |
| 2012/0182143 A1 * | 7/2012 | Gaines et al. ......... | 340/539.12 |
| 2013/0244633 A1 * | 9/2013 | Jacobs et al. .......... | 455/415 |
| 2014/0009271 A1 * | 1/2014 | Collins et al. ......... | 340/286.07 |

OTHER PUBLICATIONS

Phone Call Notification by Bluetooth Vibrating Bracelet/Gadgets—Geniusbeauty, [online] [retrieved Jan. 8, 2012]. Retrieved from internet: <URL: http://geniusbeauty.com/tech-gadgets-women/phone-call-nofitication-bluetooth-vibrating-bracelet/> pp. 1-2.

\* cited by examiner

*Primary Examiner* — Julie Lieu
(74) *Attorney, Agent, or Firm* — jAlston & Bird LLP

(57) ABSTRACT

Methods, apparatuses, and computer program products are herein provided for associating notifications with alert functions of remote devices. A method may include causing transmission of an alert configuration signal to each of a plurality of remote devices. The alert configuration signal instructs each of the plurality of remote devices to perform an alert function. The method may further include receiving user input indicating the user's desire to associate a notification corresponding to an event with the alert function of at least one of the plurality of remote devices. The method may further include associating the notification with the alert function of the at least one of the plurality of remote devices such that the at least one of the plurality of remote devices performs the alert function when the event occurs. Corresponding apparatuses and computer program products are also provided.

23 Claims, 21 Drawing Sheets

METHODS, APPARATUSES, AND COMPUTER PROGRAM PRODUCTS FOR ASSOCIATING NOTIFICATIONS WITH ALERT FUNCTIONS OF REMOTE DEVICES

TECHNOLOGICAL FIELD

An example embodiment of the present invention relates generally to user interface technology and, more particularly, relates to methods, apparatuses, and computer program products for associating notifications with alert functions of remote devices.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Embodiments of the present invention provide for association of notifications with alert functions of remote devices. In one example embodiment, a method includes causing transmission of an alert configuration signal to each of a plurality of remote devices. The alert configuration signal instructs each of the plurality of remote devices to perform an alert function. The method further includes receiving user input indicating the user's desire to associate a notification corresponding to an event with the alert function of at least one of the plurality of remote devices. The method further includes associating the notification with the alert function of the at least one of the plurality of remote devices such that the at least one of the plurality of remote devices performs the alert function when the event occurs.

In some embodiments, the method includes causing transmission of an alert configuration signal to each of the plurality of remote devices by causing transmission of an alert configuration signal to each of the plurality of remote devices in sequential order. Additionally, in some embodiments, the method includes receiving user input indicating the user's desire to associate the notification by receiving user input indicating the user's desire to associate the notification with the alert function currently being performed on at least one of the plurality of remote devices.

In some embodiments, the method includes causing transmission of a capability inquiry signal to each of the plurality of remote devices. The capability inquiry signal instructs each of the plurality of remote devices to indicate the alert functions capable of being performed by the remote device. Additionally, in some embodiments, the method includes receiving an indication from each of the plurality of remote devices that indicates the alert functions capable of being performed by the remote device. Moreover, in some embodiments, the method includes causing display of a list of the plurality of remote devices and at least one alert function capable of being performed by each of the plurality of remote devices. Further, in some embodiments, the method includes causing display of the list further by causing display of a frequency of use of each of the at least one alert function capable of being performed by each of the plurality of remote devices.

In some embodiments, the alert function comprises at least one of: a visual alert, an audio alert, or a tangible alert. In some embodiments, the alert configuration signal instructs each of the plurality of remote devices to perform an alert function at an intensity level related to a frequency of use of the alert function of the remote device over a pre-determined period of time.

In some embodiments, the method includes causing transmission of the alert configuration signal to each of the plurality of remote devices by causing transmission of the alert configuration signal to each of the plurality of remote devices that has an alert function that is not already associated with a notification for an event.

In another example embodiment, an apparatus comprises at least one processor and at least one memory storing computer program code with the at least one memory and stored computer program code being configured, with the at least one processor, to cause the apparatus to cause transmission of an alert configuration signal to each of a plurality of remote devices. The alert configuration signal instructs each of the plurality of remote devices to perform an alert function. The at least one memory and stored computer program code are configured, with the at least one processor, to further cause the apparatus to receive user input indicating the user's desire to associate a notification corresponding to an event with the alert function of at least one of the plurality of remote devices. The at least one memory and stored computer program code are configured, with the at least one processor, to further cause the apparatus to associate the notification with the alert function of the at least one of the plurality of remote devices such that the at least one of the plurality of remote devices performs the alert function when the event occurs.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including causing transmission of an alert configuration signal to each of a plurality of remote devices. The alert configuration signal instructs each of the plurality of remote devices to perform an alert function. The method further includes receiving user input indicating the user's desire to associate a notification corresponding to an event with the alert function of at least one of the plurality of remote devices. The method further includes associating the notification with the alert function of the at least one of the plurality of remote devices such that the at least one of the plurality of remote devices performs the alert function when the event occurs.

In another example embodiment, an apparatus is provided. The apparatus comprises means for causing transmission of an alert configuration signal to each of a plurality of remote devices. The alert configuration signal instructs each of the plurality of remote devices to perform an alert function. The apparatus further comprises means for receiving user input indicating the user's desire to associate a notification corresponding to an event with the alert function of at least one of the plurality of remote devices. The apparatus further comprises means for associating the notification with the alert function of the at least one of the plurality of remote devices such that the at least one of the plurality of remote devices performs the alert function when the event occurs.

BRIEF DESCRIPTION OF THE DRAWINGS

Figure 1:
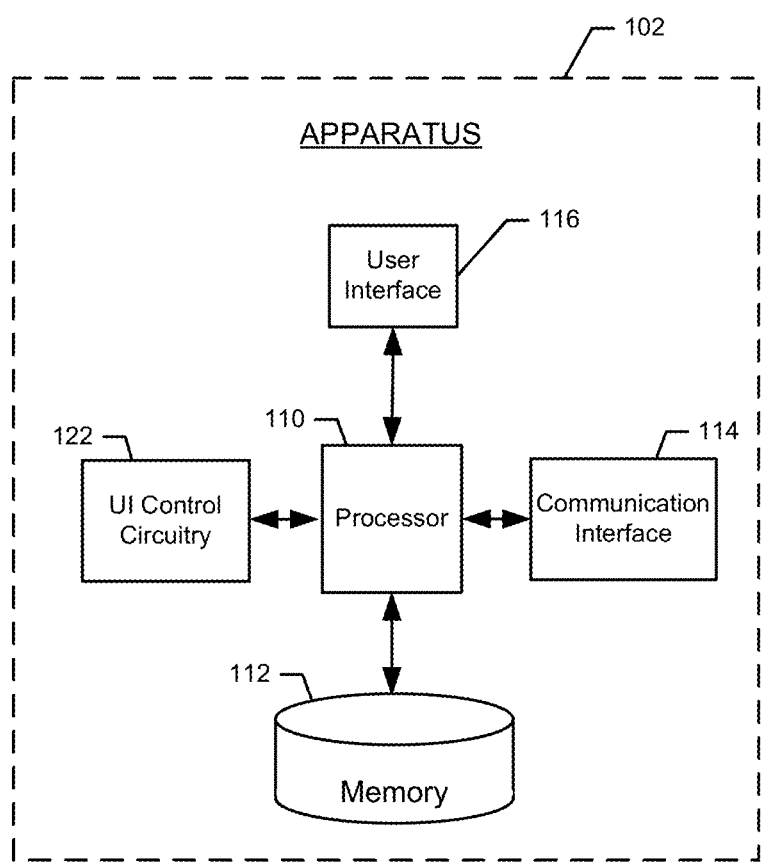
Figure 2:
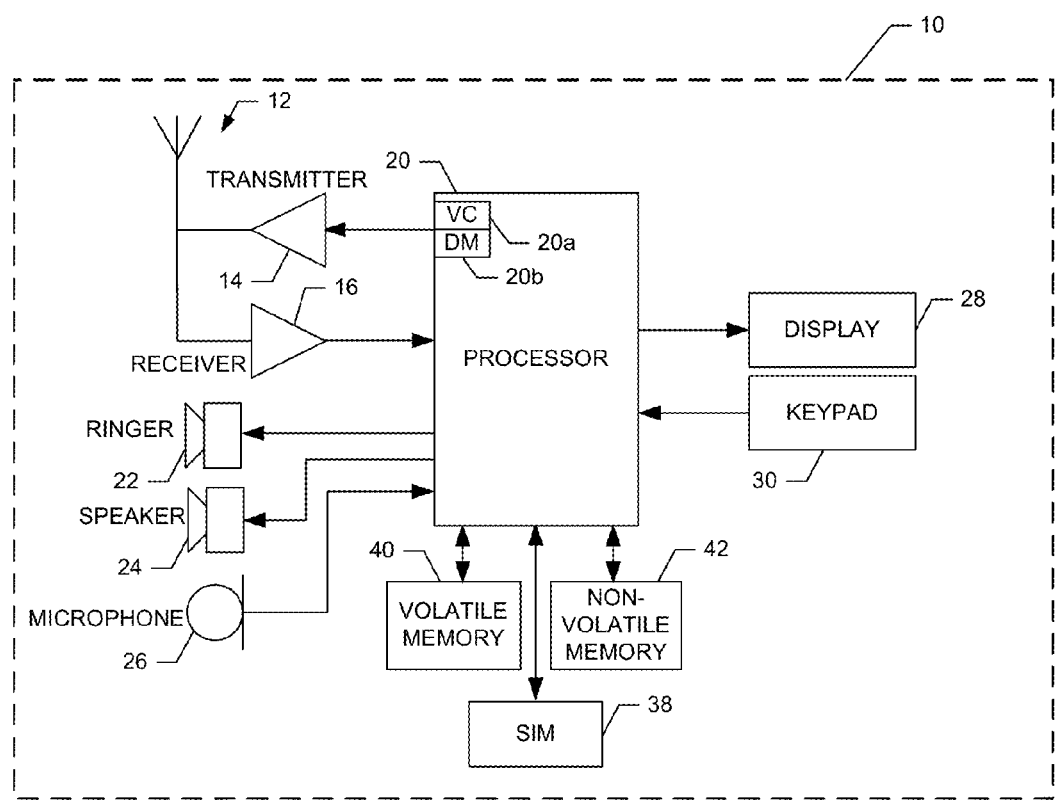
Figure 3:
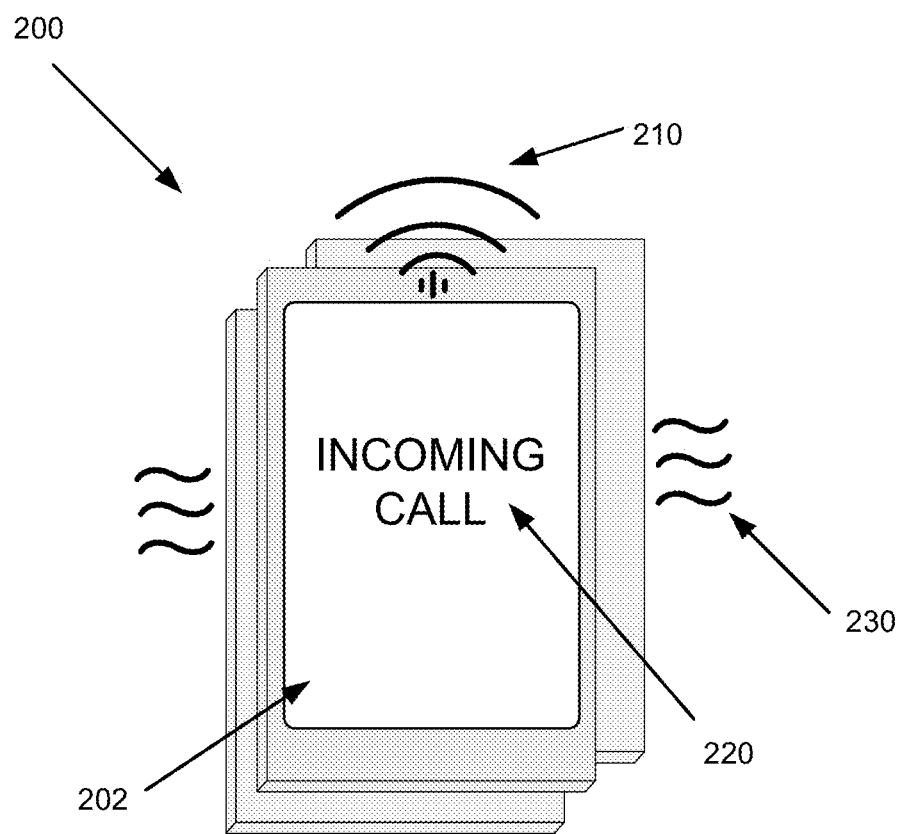
Figure 4:
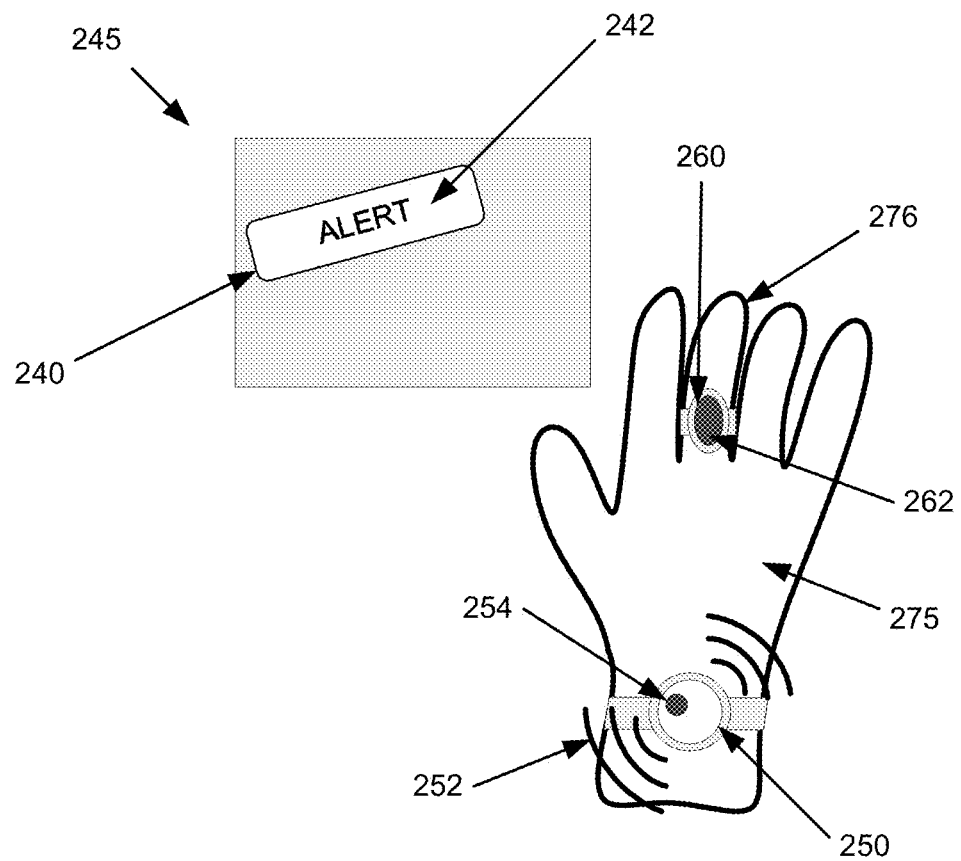
Figure 5:
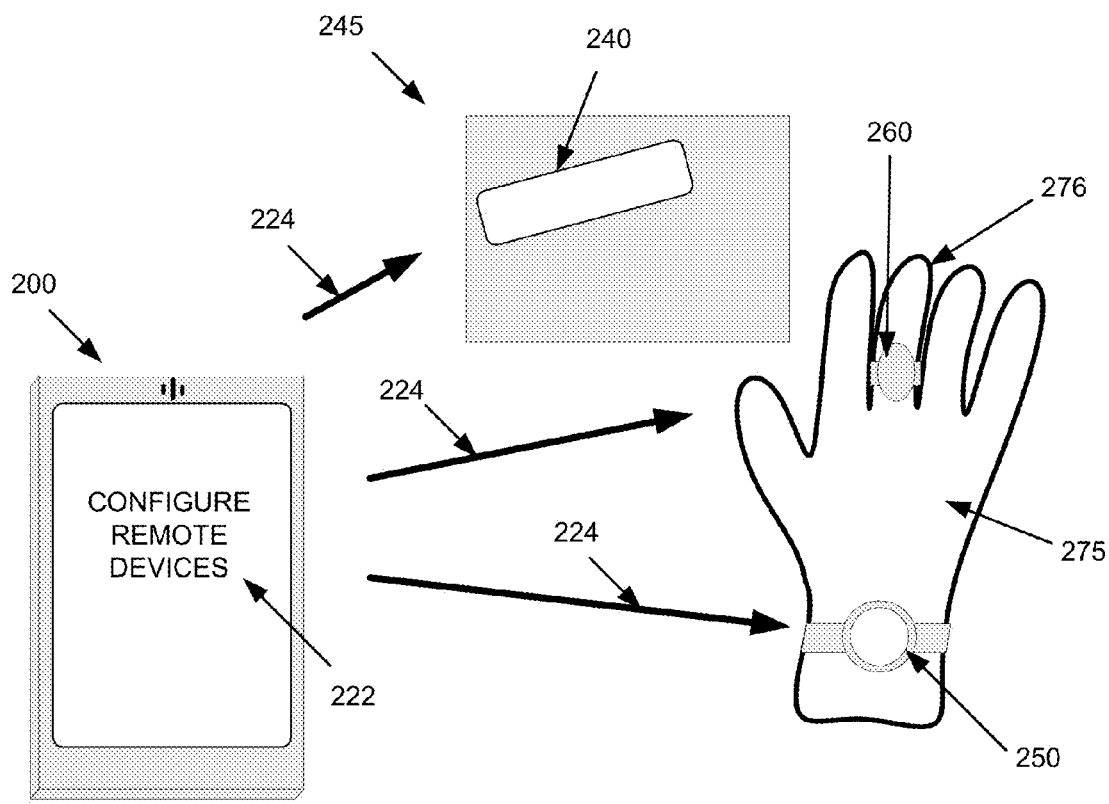
Figure 5A:
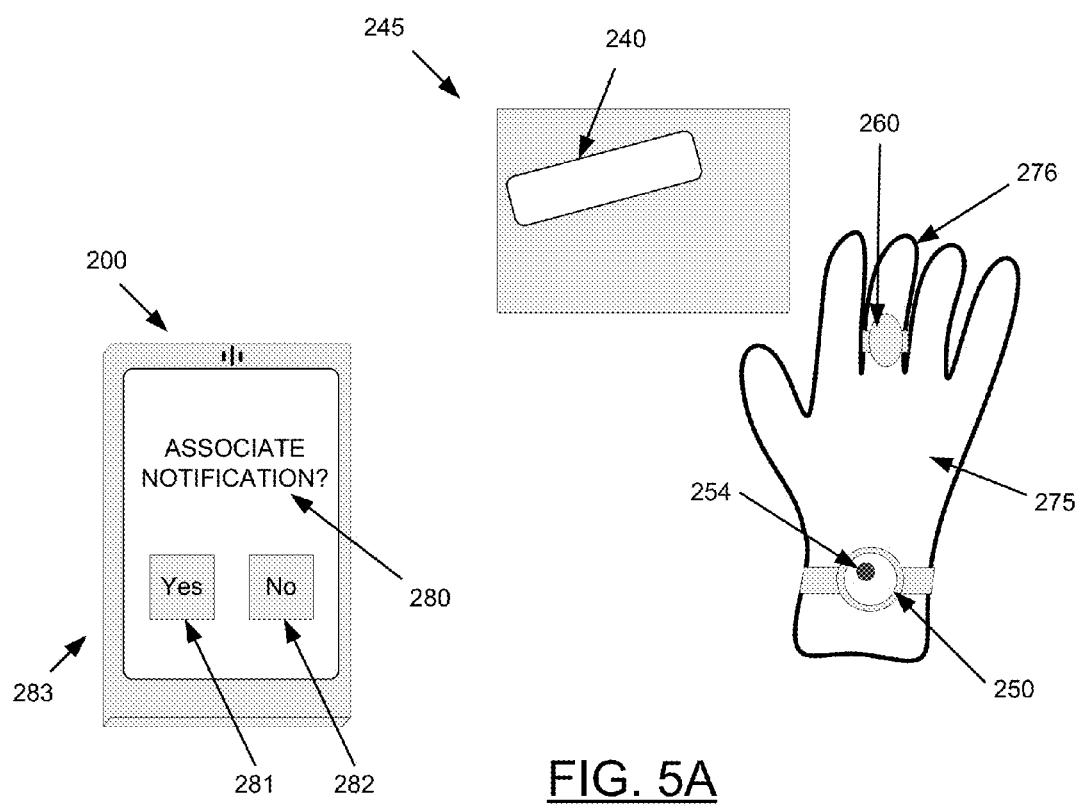
Figure 5B:
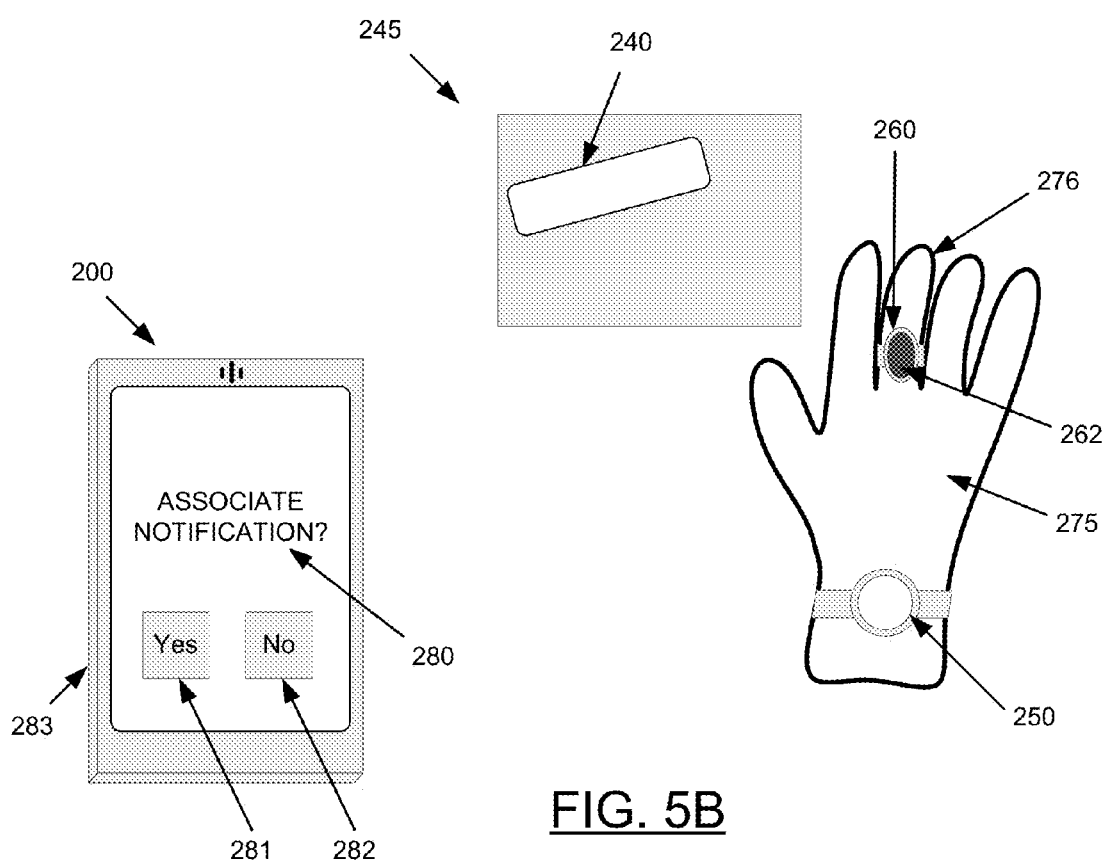
Figure 5C:
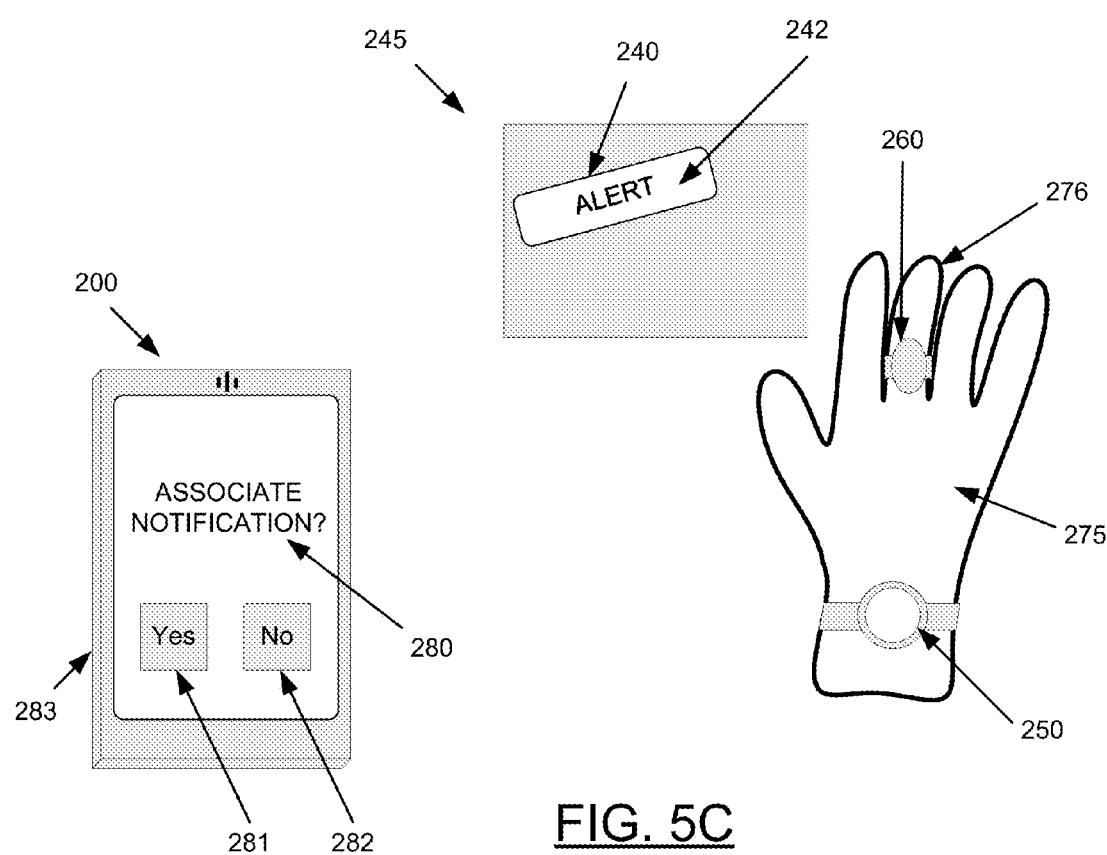
Figure 6:
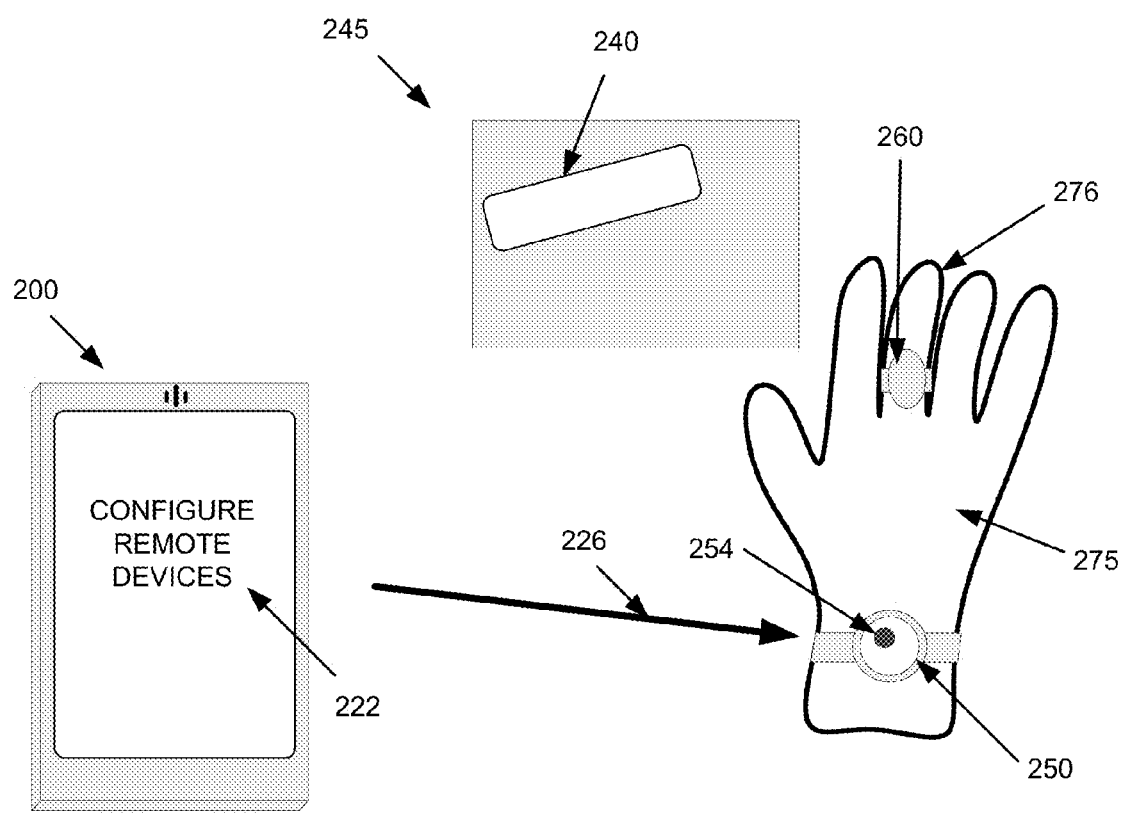
Figure 6A:
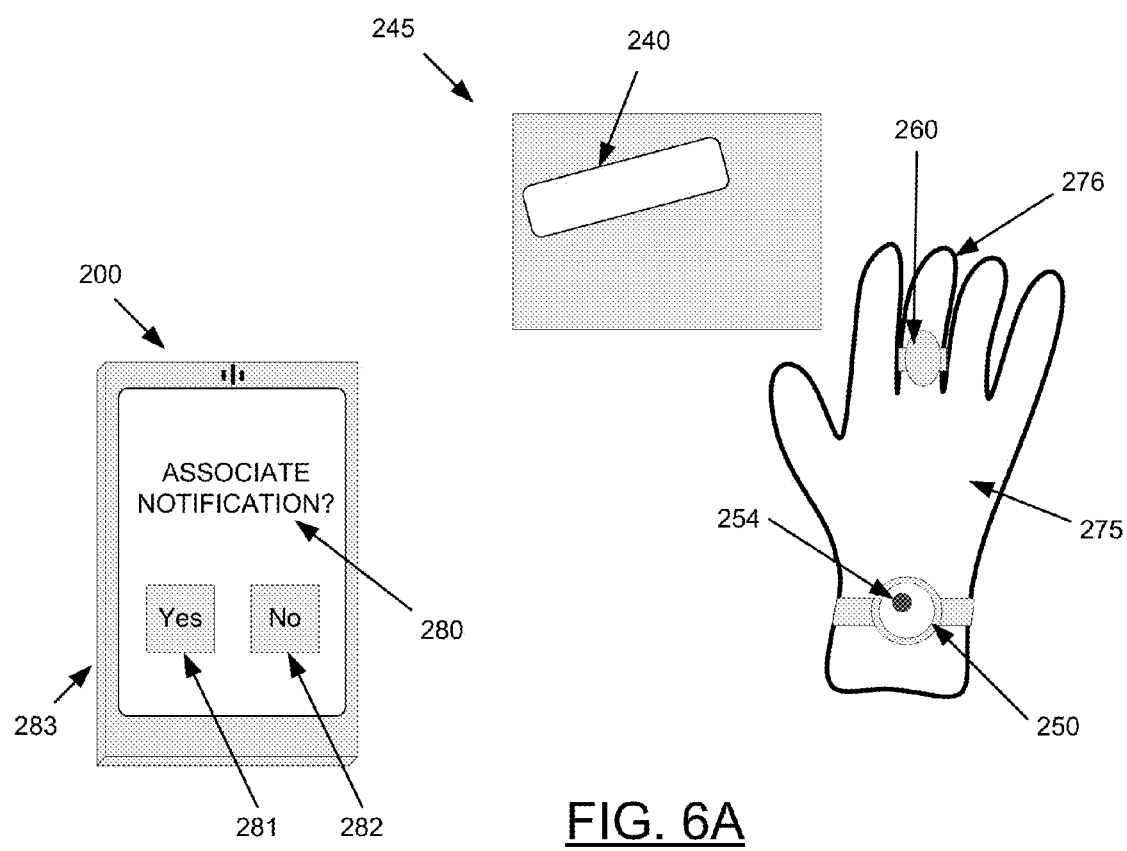
Figure 7:
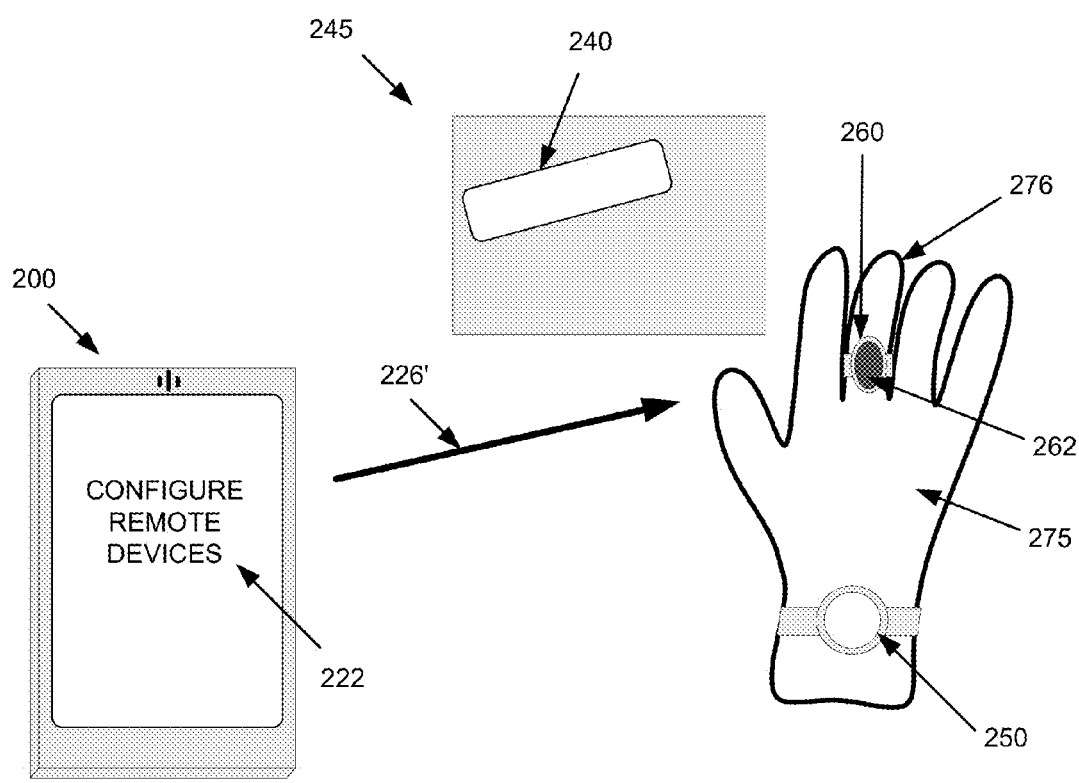
Figure 7A:
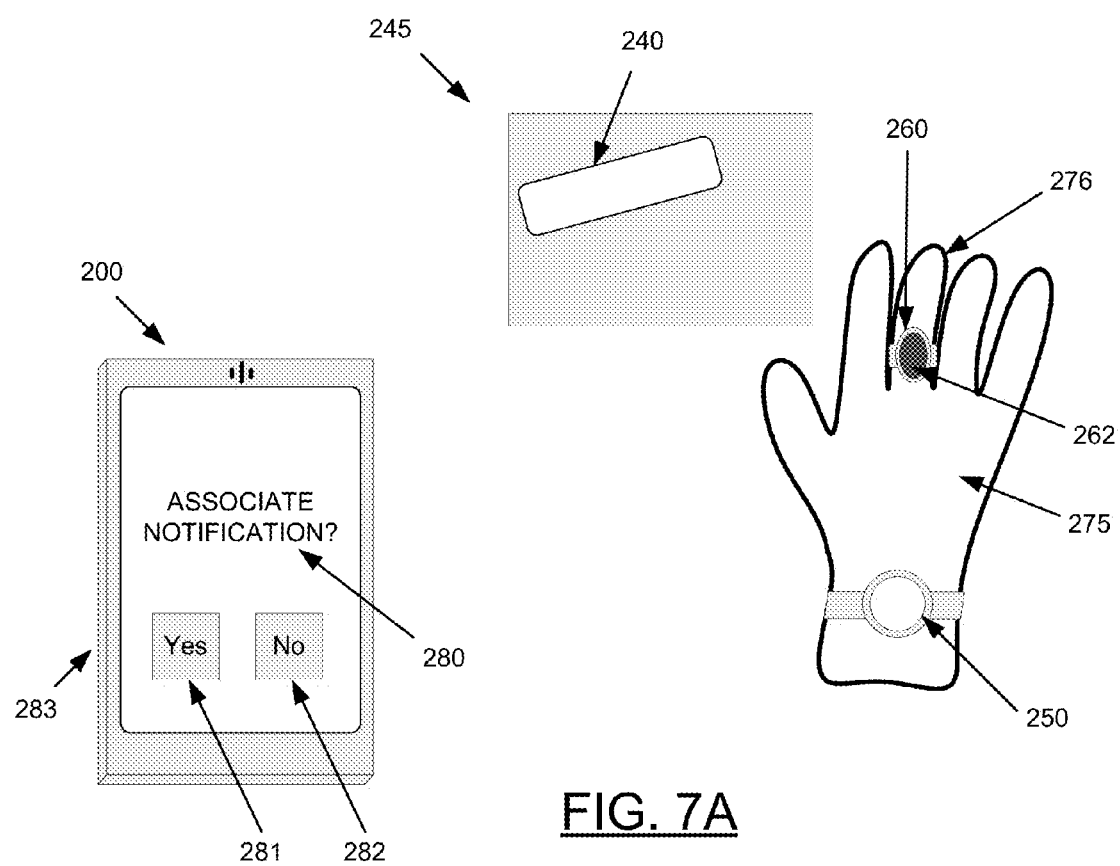
Figure 8:
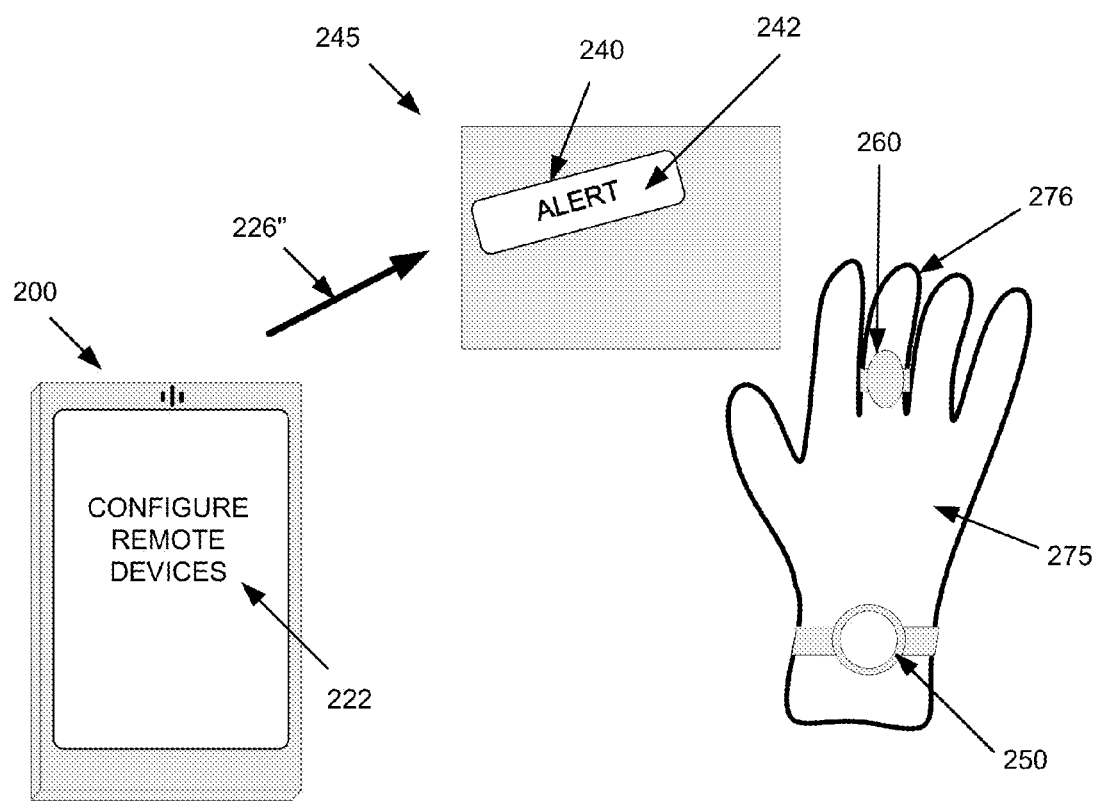
Figure 8A:
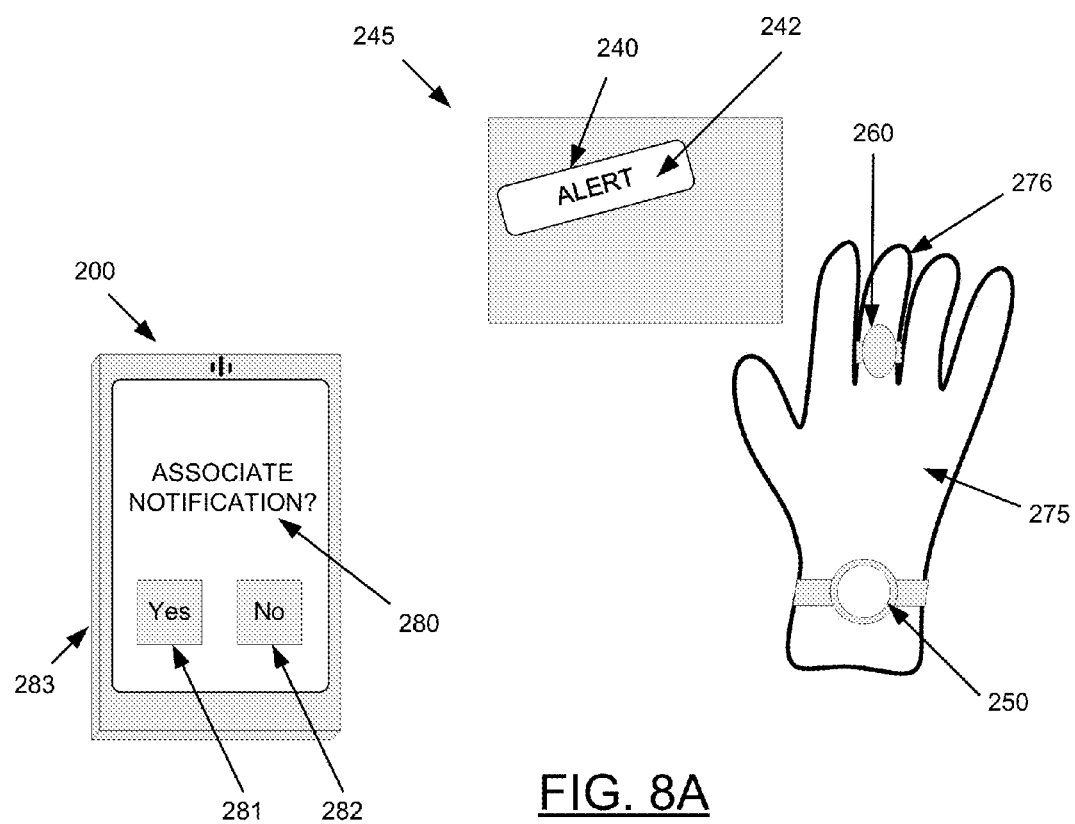
Figure 9:
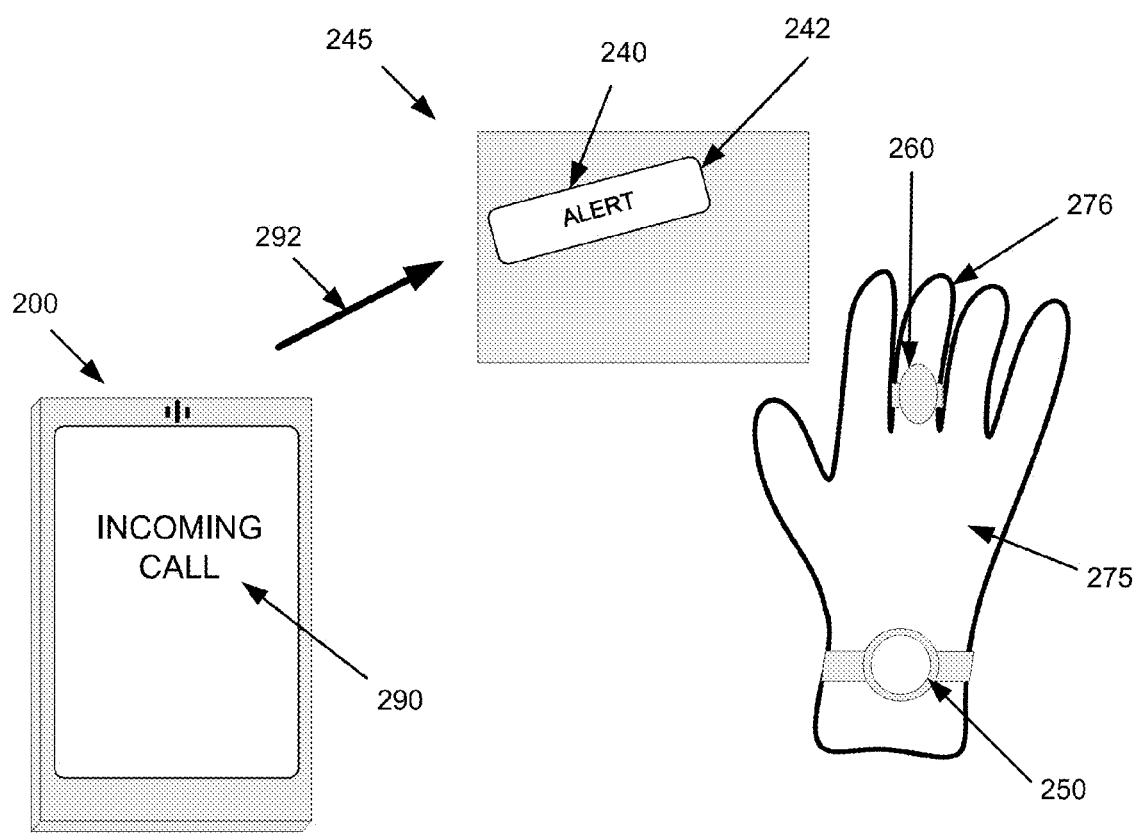
Figure 9A:
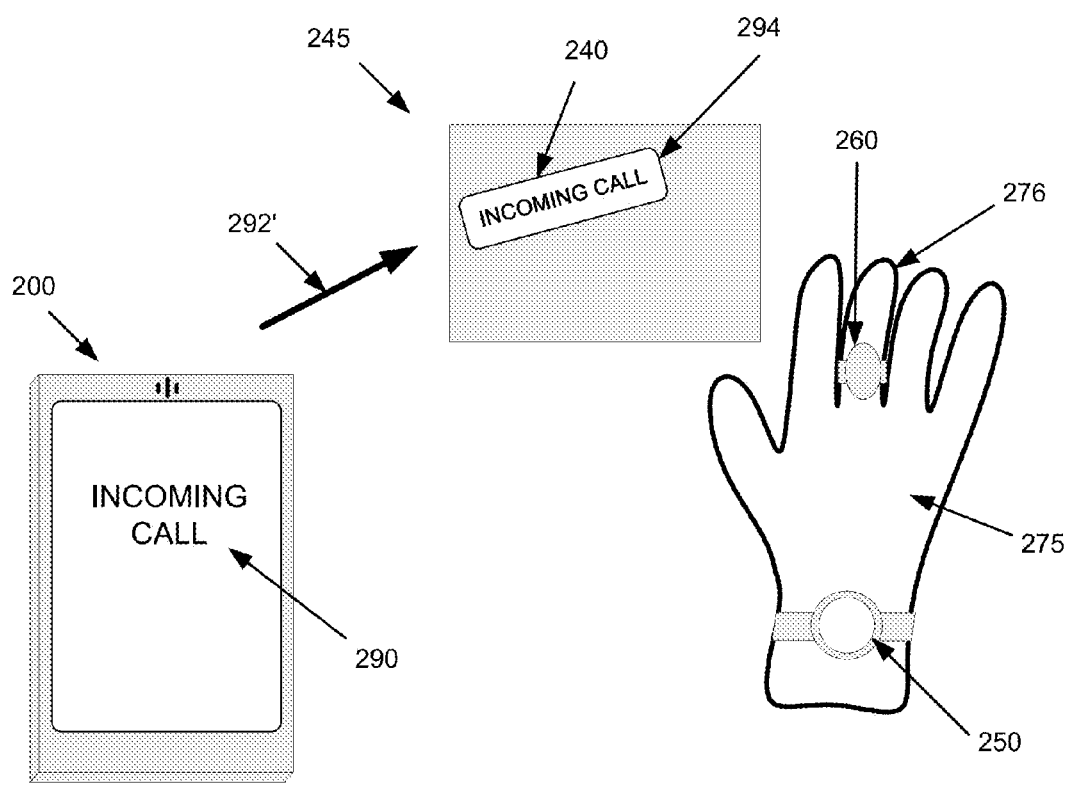
Figure 9B:
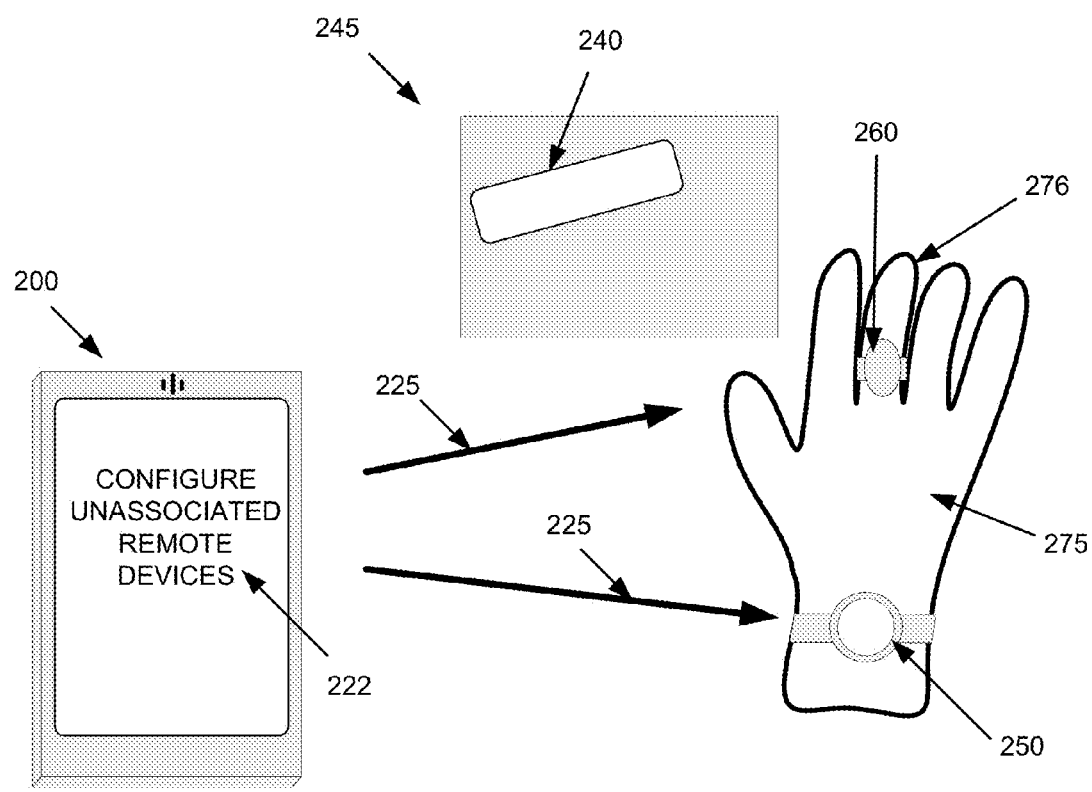
Figure 10:
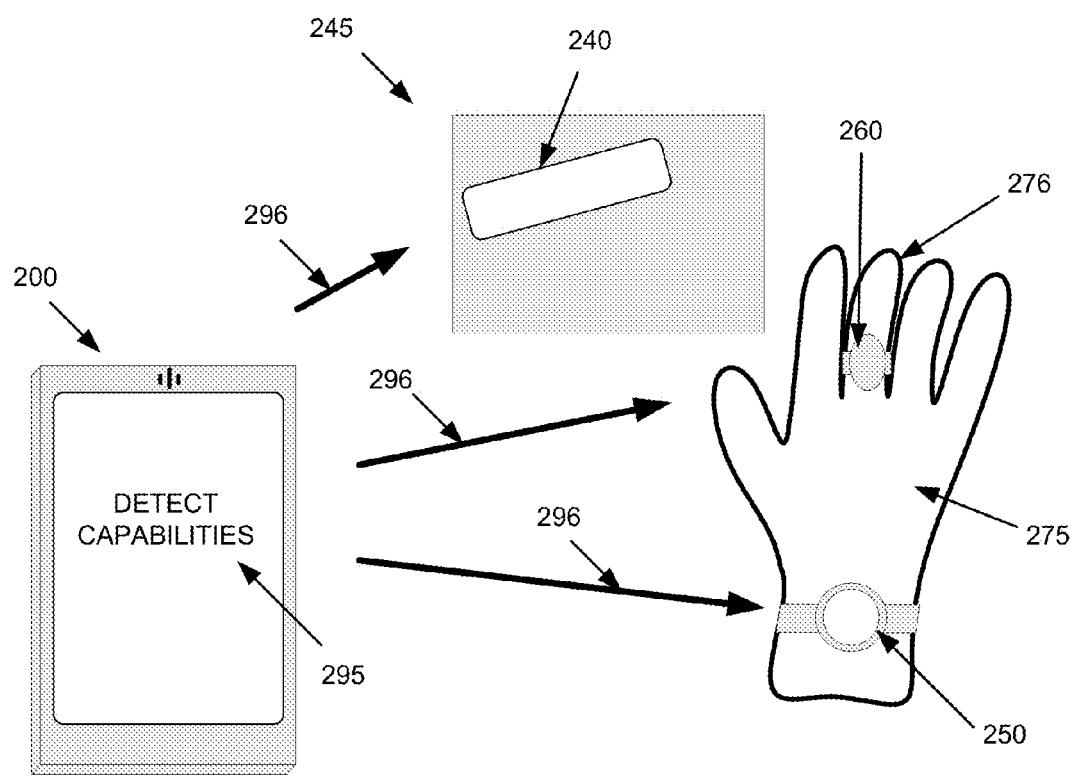
Figure 10A:
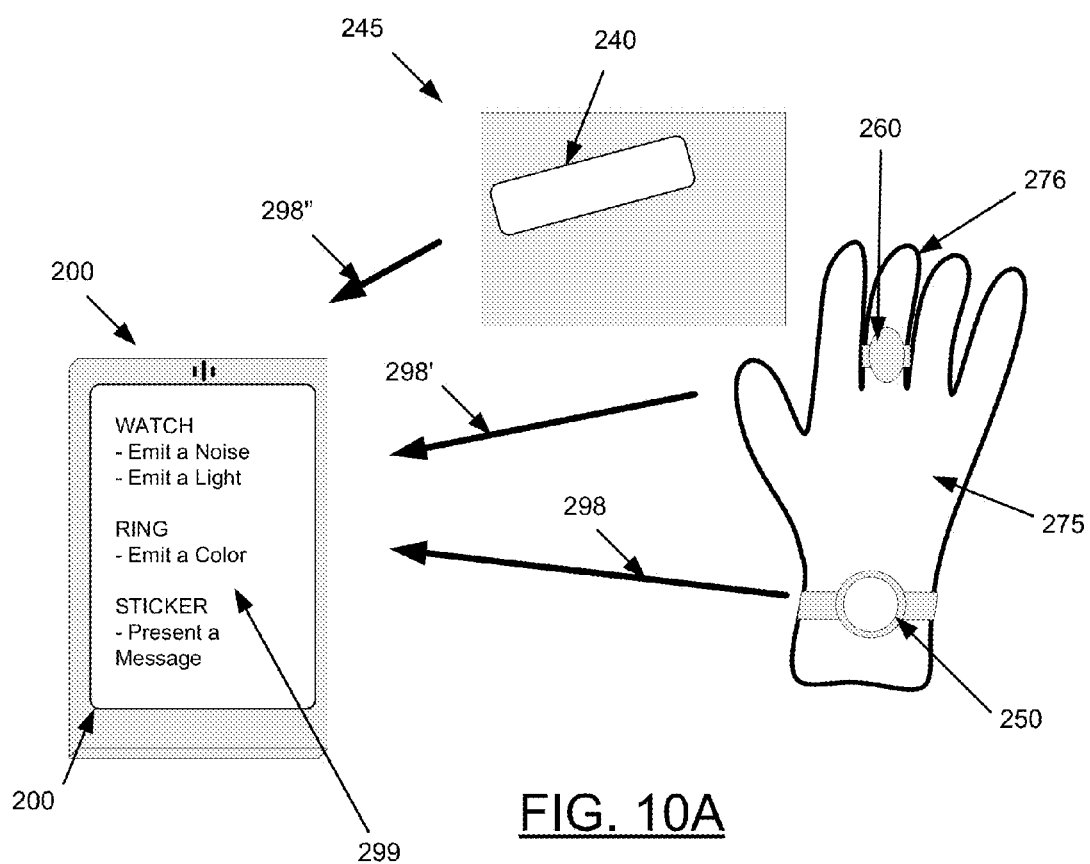
Figure 11:
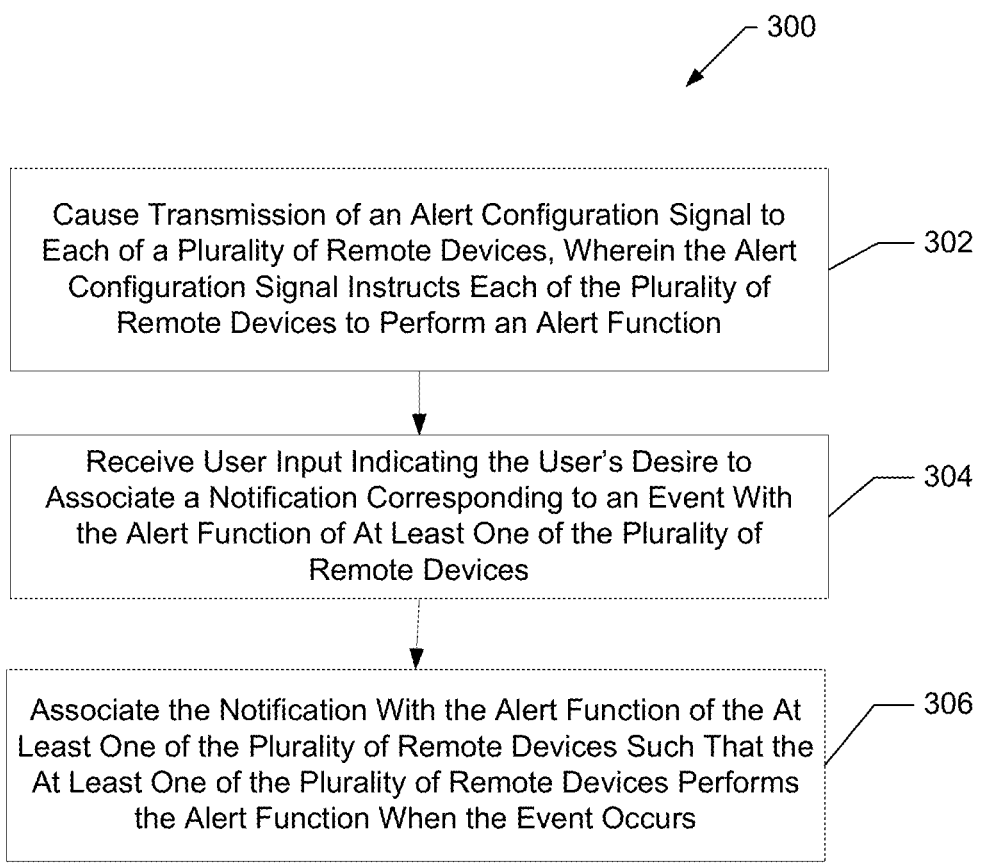
Figure 12:
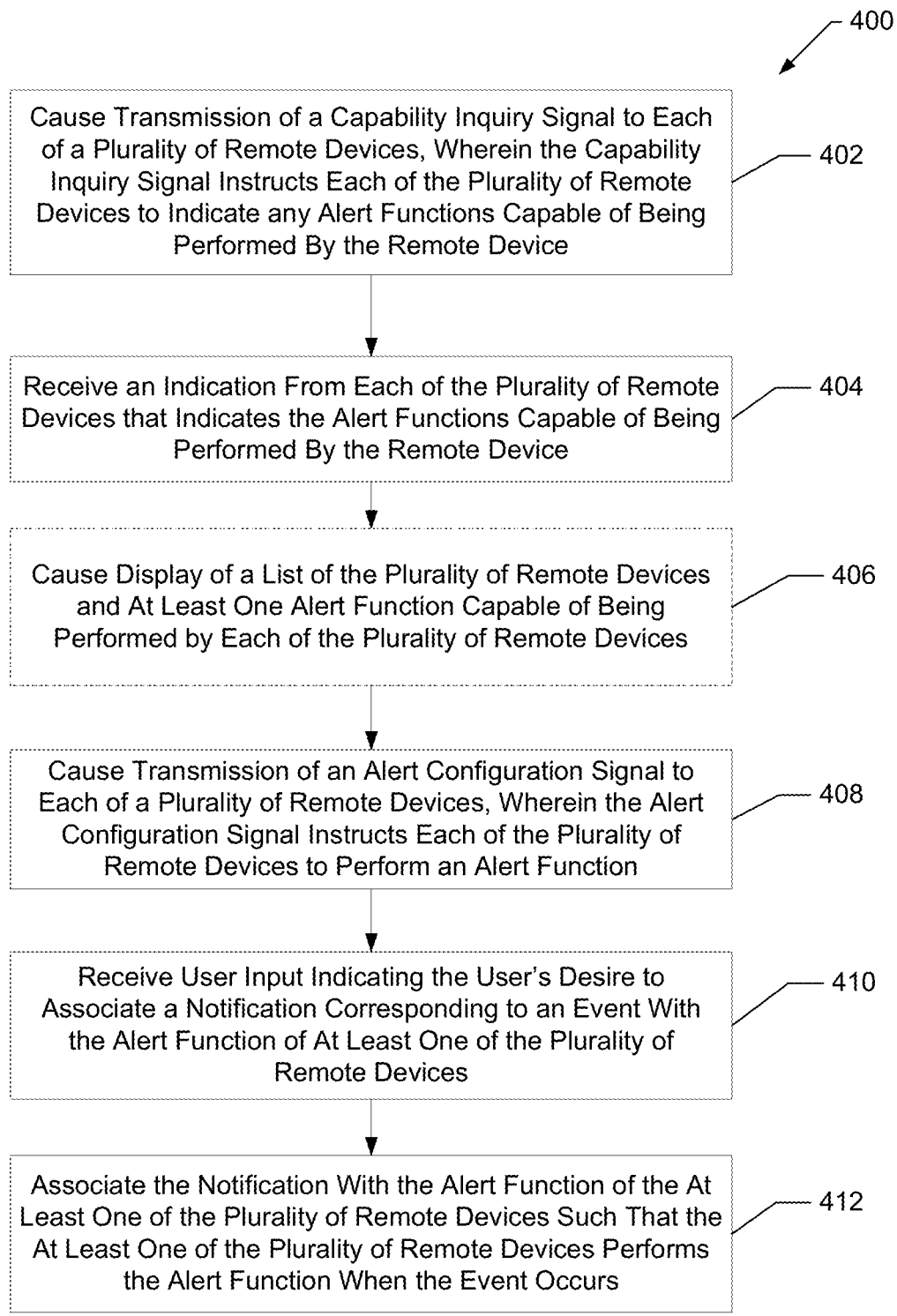

Having thus described some embodiments of the invention in general terms, reference will now be made to the accompanying drawings, which are not necessarily drawn to scale, and wherein:

FIG. 1 illustrates a block diagram of an apparatus with function capabilities for performing notifications for events according to an example embodiment of the present invention;

FIG. 2 is a schematic block diagram of a mobile terminal according to an example embodiment of the present invention;

FIG. 3 illustrates an example apparatus that may embody, for example, the apparatus shown in FIG. 1, wherein the apparatus is performing a number of alert functions, in accordance with an example embodiment of the present invention described herein;

FIG. 4 illustrates example remote devices capable of performing alert functions, in accordance with an example embodiment of the present invention described herein;

FIG. 5 illustrates an example environment of the apparatus shown in FIG. 3, wherein three remote devices are positioned relative to the apparatus, in accordance with an example embodiment of the present invention described herein;

FIG. 5A illustrates a first remote device performing an alert function, in accordance with an example embodiment of the present invention described herein;

FIG. 5B illustrates a second remote device performing an alert function, in accordance with an example embodiment of the present invention described herein;

FIG. 5C illustrates a third remote device performing an alert function, in accordance with an example embodiment of the present invention described herein;

FIG. 6 illustrates a first remote device receiving a signal from the apparatus shown in FIG. 3 and, in response, performing an alert function, in accordance with an example embodiment of the present invention described herein;

FIG. 6A illustrates the apparatus of FIG. 6 prompting a user to determine whether the apparatus should associate the notification with the alert function of the first remote device of FIG. 6, in accordance with an example embodiment of the present invention described herein;

FIG. 7 illustrates a second remote device receiving a signal from the apparatus shown in FIG. 3 and, in response, performing an alert function, in accordance with an example embodiment of the present invention described herein;

FIG. 7A illustrates the apparatus of FIG. 7 prompting a user to determine whether the apparatus should associate the notification with the alert function of the second remote device of FIG. 7, in accordance with an example embodiment of the present invention described herein;

FIG. 8 illustrates a third remote device receiving a signal from the apparatus shown in FIG. 3 and, in response, performing an alert function, in accordance with an example embodiment of the present invention described herein;

FIG. 8A illustrates the apparatus of FIG. 8 prompting a user to determine whether the apparatus should associate the notification with the alert function of the third remote device of FIG. 8, in accordance with an example embodiment of the present invention described herein;

FIG. 9 illustrates the third remote device of FIG. 8 receiving an indication from the apparatus of FIG. 8 to perform an alert function in response to the event of an incoming call, in accordance with an example embodiment of the present invention described herein;

FIG. 9A illustrates the third remote device of FIG. 8 receiving an indication from the apparatus of FIG. 8 to perform an alert function in response to the event of an incoming call, wherein the third remote device displays "INCOMING CALL" as the alert function, in accordance with an example embodiment of the present invention described herein;

FIG. 9B illustrates the apparatus of FIG. 9 transmitting a signal to the first and second remote device, in accordance with an example embodiment of the present invention described herein;

FIG. 10 illustrates the apparatus shown in FIG. 3 transmitting a signal to three remote devices positioned relative to the apparatus, in accordance with an example embodiment of the present invention described herein;

FIG. 10A illustrates the apparatus shown in FIG. 10 receiving a signal from each of the three remote devices shown in FIG. 10, in accordance with an example embodiment of the present invention described herein;

FIG. 11 illustrates a flowchart according to an example method for associating notifications with alert functions of remote devices, in accordance with an example embodiment of the present invention described herein; and FIG. 12 illustrates a flowchart according to another example method for associating notifications with alert functions of remote devices, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for associating notifications with alert functions of remote devices according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102 may be configured to perform operations (e.g., applications, telephone calls, etc.). Sometimes events may occur, often corresponding to such operations (e.g., the apparatus receives an incoming call). Additionally, the apparatus 102 may be configured to provide a notification to a user. In some embodiments, the notification may correspond to an event that has occurred.

In some embodiments, the apparatus 102 may be configured to perform at least one alert function. Such an alert function may be useful for performing a notification that an event has occurred. For example, with reference to FIG. 3, a device 200, such as may employ embodiments of apparatus 102, may receive an event (e.g., an incoming call). In response to such an event, the device 200 may perform at least one alert function. In the depicted embodiment, the device 200 is configured to perform a visual alert function, such as display the message "INCOMING CALL" 220 on a screen 202. Additionally, the device 200 may be configured to perform an audible alert function, such as emit a noise (e.g., ring tone) 210. Moreover, the device 200 may be configured to perform a tangible alert function, such as vibrate 230. While the depicted embodiment of the device 200 performs a visual, audible, and tangible alert function as a notification for receiving an incoming call, the device 200 may be configured to perform any number or types of alert functions (e.g., the device 200 may only vibrate in response to receiving an incoming call).

Increased functionality in mobile computing devices, such as in some embodiments of apparatus 102, however, has led to an increasing number of events that provide notifications to users. With so many notifications, it can be difficult to discern the event that corresponds with the notification. Additionally, a notification may be unwanted in a certain form or, in some cases, may be more desirable in another form.

Many different devices are often being used in a person's daily life. Such devices may now include functionality that enables some form of alert function. With increased functionality of all types of devices and the increased number of devices a user may have, there are often multiple devices capable of performing alert functions in proximity of apparatus 102. Moreover, a user may often carry certain devices with alert functions. Indeed, a user may have a watch, ring, pendant, personal digital assistant, music player, or other devices, each capable of performing at least one alert function. For example, with reference to FIG. 4, a user 275 may wear a watch 250 and a ring 260. Additionally, a user 275 may carry a notebook 245 with a digital sticker 240 on it. Such remote devices may have the capability to perform alert functions. For example, in the depicted embodiment, the ring 260 may emit different colors 262. The sticker 240 may display a message 242, such as "ALERT." Similarly, the watch 250 may emit a light 254 as a visual alert. However, the watch 250, based on its capabilities, may also perform other alert functions, such as emit a noise 252 (e.g., an alarm).

With so many different types of devices available for users today, a user may wish to utilize a specific alert function of another device to act as a notification of an event that occurs on a mobile computing device. Thus, while an event may occur on a mobile computing device, a remote device, such as a user's watch, may serve to notify the user of that event occurring on the mobile computing device. Such a situation may be useful for additional notification possibilities.

Some example embodiments of the present invention may utilize alert functions of remote devices to provide notifications to a user. Additionally, in some embodiments, a user may customize which notifications match the available alert functions of available remote devices. For example, a user may want to keep their mobile computing device hidden (e.g., in their pocket), but may wish to still be notified of an incoming call. In such a case, a user may wish to associate the notification of an incoming call with an alert function of the watch (e.g., the watch lights up). As such, when a user receives an incoming call, the watch may light up to notify the person of the incoming call. In such a manner, a user is notified of an incoming call without having to remove their mobile computing device from their pocket. In such a manner, a user may customize their notifications with the alert functionality of different remote devices available in their environment.

In some embodiments, the apparatus 102 may be configured to determine if any remote devices with alert functionality are proximate. For example, the apparatus 102 may be configured to communicate with a remote device, such as through communication interface 114. In such a situation, the apparatus 102 may query the remote device to determine if the remote device has alert functionality. Additionally or alternatively, in some embodiments, the apparatus 102 may be configured to communicate with a network or server that provides an indication of any remote devices with alert functionality that are proximate the apparatus 102. Alternatively, the apparatus 102, in some embodiments, may be configured to carry out some of the embodiments described herein without knowledge of the proximate remote devices or their corresponding functionality.

In some embodiments, the apparatus 102 may be configured to query remote devices to indicate the alert functions that are available for association with notifications. In some embodiments, the apparatus 102 may be configured to cause transmission of an alert configuration signal to each of a plurality of remote devices. The alert configuration signal may instruct each of the plurality of remote devices to perform an alert function. Such an embodiment may cause the remote devices to each perform alert functions to provide a user with an indication of available alert functions for association with notifications. For example, with reference to FIG. 5, the device 200 may be configured to transmit a signal 224 (e.g., an alert configuration signal) to each of a watch 250, ring 260, and sticker 240. The signal 224 may be configured to instruct each of the watch 250, ring 260, and sticker 240 to each perform alert functions. Thus, with reference to FIG. 5A, in response to the signal 224, the watch 250 may emit a light 254. With reference to FIG. 5B, in response to the signal 224, the ring 260 may emit a color 262. Similarly, with reference to FIG. 5C, in response to the signal 224, the sticker 240 may display a message such as "ALERT" 242.

In some embodiments, the apparatus 102 may be configured to receive user input indicating the user's desire to associate a notification corresponding to an event with the alert function of at least one of the plurality of remote devices. For example, the user may perceive (e.g., hear, see, feel, etc.) an alert function from a remote device. Then, in some cases, the user may desire for that alert function to associate with a notification for an event. The user may provide some user input to indicate such a desire to the apparatus 102. For example, with reference to FIG. 5A, in correlation with the presentation of the alert function 254 of the watch 250, the user 275 may be presented with an option 283 to provide an indication of whether the user 275 wishes to associate a notification with alert function 254 of the watch 250. In the depicted embodiment, a message of "ASSOCIATE NOTIFICATION?" 280 is displayed with a selection of "Yes" 281 or "No" 282 available.

Upon selection of the "Yes" 281, the device 200 may be configured to associate the alert function 254 (e.g., emitting of the light) of the watch 250 to the notification of an event. Such an association will be described in greater detail herein.

However, upon selection of the "No" 282, the alert function 254 of the watch 250 may cease performance and, with reference to FIG. 5B, the alert function 262 (e.g., emitting a color) of the ring 260 may begin performance. Similarly, the user 275 may be presented with an option 283 for providing user input to indicate an association of the notification with the alert function 262. Thus, the user 275 may select "Yes" 281 or "No" 282 to indicate their desire. Then, upon selection of the "No" 282, the alert function 262 of the ring 260 may cease performance and, with reference to FIG. 5C, the alert function 242 (e.g., presenting a message of "ALERT") of the sticker 240 may begin performance. Then, the user 275 may be presented with an option 283 for providing user input to indicate an association of the notification with the alert function 242.

Though in the depicted embodiment, the option 283 for the user 275 to provide input is presented during performance of the alert function, the option 283 may be presented at other times, such as before or after performance of the alert function of the remote device. Additionally, though the depicted embodiment comprises a device 200 that is configured to receive user input after performance of each of the alert functions of the remote devices, in some embodiments, the alert functions may each perform in order and the user may provide input to associate the notification to the currently performing alert function. In such an embodiment, the alert functions may perform one after the other until the user associates one with the notification or all the alert functions have been performed.

In some embodiments, the apparatus 102 may be configured to cause transmission of an alert configuration signal to each of the plurality of remote devices in sequential order. For example, with reference to FIG. 6, the device 200 may transmit an alert configuration signal 226 to the watch 250 to instruct the watch 250 to perform an alert function 254, such as emitting a light. In response, the alert function 254 may be performed by the watch 250.

Additionally, in some embodiments, the apparatus 102 may be configured to receive user input indicating the user's desire to associate a notification corresponding to an event with the alert function currently being performed on at least one of the plurality of remote devices. For example, with reference to FIG. 6A, the user 275 may be presented with the option 283 to associate the notification with the alert function 254 of the watch 250. Then, upon selection of "No" 282, the device 200, with reference to FIG. 7, may transmit another alert configuration signal 226' to the ring 260, instructing the ring 260 to perform an alert function 262, such as emitting a color. In response, the alert function 262 may be performed by the ring 260 and, with reference to FIG. 7A, the user 275 may be presented with the option 283 to associate the notification with the alert function 262 of the ring 260. Next, upon selection of the "No" 282, the device 200, with reference to FIG. 8, may transmit another alert configuration signal 226" to the sticker 240, instructing the sticker 240 to perform an alert function 242, such as presenting the message "ALERT". In response, the alert function 242 may be performed by the sticker 240 and, with reference to FIG. 8A, the user 275 may be presented with the option 283 to associate the notification with the alert function 242 of the sticker 240.

In some embodiments, the apparatus 102 may be configured to associate the notification with the alert function of the at least one of the plurality of remote devices such that the at least one of the plurality of remote devices performs the alert function when the event occurs. In such a manner, the user 275 may become aware of an event (e.g., an incoming call) happening on the apparatus 102 through an alert function of a remote device. For example, with reference to FIGS. 5C and 8A, the user 275 was presented with an option 283 to associate the notification with the alert function 242 of the sticker 240. In some cases, the user 275 may select "Yes" 281 to indicate their desire to associate the notification with the alert function 242. In response to that indication, the device 200 may be configured to associate the notification with the alert function 242 of the sticker 240. For example, with reference to FIG. 9, in a situation of the event being an incoming call, the device 200 may be configured to associate the notification for the incoming call with the alert function 242 of the sticker 240. Thus, in the depicted embodiment, the device 200 may receive an incoming call, as evidenced by the presentation of the message "INCOMING CALL" 290 on the screen 202 of the device 200. In response to receiving the incoming call, and due to the association between the notification of the incoming call and the alert function 242 of the sticker 240, the device 200 may be configured to transmit an alert signal 292 to the sticker 240 to instruct the sticker 240 to perform the associated alert function 242. As such, the sticker 240 presents the message "ALERT" 242. In such a manner, the user 275 becomes aware of the incoming call even without needing to interact with (e.g., hear, see, feel, etc.) the device 200.

Though the above described example embodiments provide for user input on the apparatus 102 (e.g., device 200), in some embodiments, the user may provide input directly to the remote device (e.g., watch 250) to indicate a desire to associate the alert function of the remote device with the desired notification. For example, if the user provides input to the remote device, a signal may be sent from the remote device to the apparatus 102 that indicates the desire of the user to associate the alert function of the remote device with the notification.

Additionally, in some embodiments, the apparatus 102 may be configured to cause modification to the alert function of the remote device. In some embodiments, the apparatus 102 may be configured to cause the alert function to present a message that is tailored to the associated notification. For example, with reference to FIG. 9A, in response to receiving an incoming call, the device 200 may transmit an alert signal 292' to the sticker 240 to instruct the sticker 240 to perform the associated alert function 242. The alert signal 292' may, however, instruct the sticker 240 to present the message "INCOMING CALL" 294.

Though the above described depicted embodiments show visual alerts being performed by remote devices, other types of alert functions (e.g., audio, tangible, etc.) may be used. Additionally, in some embodiments, the apparatus 102 may be configured to transmit an alert configuration signal that instructs all remote devices with a specific type (e.g., visual, audio, or tangible) of alert function to perform the specific type of alert function for possible association. In such a manner, the user may specify the specific type of alert function for possible association. On the other hand, however, in some embodiments, the apparatus 102 may be configured to transmit an alert configuration signal that instructs all remote devices with any type of alert function to perform the alert function for possible association.

In some embodiments, the apparatus 102 may be configured to keep track of the association of the alert function of the remote device. In such a manner, the apparatus 102 may manage the available alert functions of the available remote devices. Along these lines, in some embodiments, the apparatus 102 may be configured to cause transmission of the alert configuration signal to each of the plurality of remote devices that has an alert function that is not already associated with a notification for an event. As such, the user may be prompted only with alert functions of remote devices that are available for association. For example, with reference to FIG. 9B, the device 200 may be configured to transmit a signal 225 (e.g., an alert configuration signal) to only the ring 260 and watch 250, as the sticker 240 has already been associated with the notification for an incoming call (shown in FIGS. 9 and 9A).

In some embodiments, the apparatus 102 may be configured to cause modification to the alert function of the remote devices. In such a way, the user may receive additional information regarding the alert function of the remote device. For example, in some embodiments, the apparatus 102 may be configured to transmit an alert configuration signal that instructs each of the plurality of remote devices to perform an alert function at an intensity level related to a frequency of use of the alert function of the remote device over a pre-determined period of time. For example, the emission of color (e.g., alert function 262) of the ring 260 may occur less often than the emission of light (e.g., alert function 254) of the watch 250. Thus, in some embodiments, in response to receiving the alert configuration signal, the watch 250 may emit a light with an intensity that is greater than the intensity of the color being emitted from the ring 260. Though a directly proportional relationship is described above, other relationships between intensity and frequency may be used (e.g., an inversely proportional relationship). Providing this additional information regarding frequency of use of the alert function may further aid the user in making a decision as to which alert function to associate with the notification for a certain event.

In some embodiments, the apparatus 102 may be configured to gather information regarding the capabilities of available remote devices and present the information to the user. In some embodiments, the apparatus 102 may be configured to cause transmission of a capability inquiry signal to each of the plurality of remote devices. The capability inquiry signal may instruct each of the plurality of remote devices to indicate the alert functions capable of being performed by the remote devices. For example, with reference to FIG. 10, the device 200 may transmit a signal 296 (e.g., a capability inquiry signal) to detect the alert functions capable of being performed by each of the sticker 240, ring 260, and watch 250.

In some embodiments, the apparatus 102 may be configured to receive an indication from each of the plurality of remote devices that indicates the alert functions capable of being performed by the remote device. For example, with reference to FIG. 10A, the watch 250 may transmit a signal 298 to the device 200 that indicates the alert function capabilities of the watch 250. For example, the signal 298 may indicate that the watch 250 may perform alert functions 252 (emit a noise) and 254 (emit a light). Likewise, the ring 260 may transmit a signal 298' that indicates that it can perform alert function 262 (emit a color). Additionally, the sticker 240 may transmit a signal 298" that indicates that it can perform alert function 242 (present a message of "ALERT").

Additionally or alternatively, in some embodiments, the apparatus 102 may be configured to receive an indication of the alert functions capable of being performed by at least one proximate remote device from a server.

Additionally, in some embodiments, the apparatus 102 may be configured to cause display of a list of the plurality of remote devices and at least one alert function capable of being performed by each of the plurality of remote devices. For example, with reference to FIG. 10A, the device 200, such as on screen 202, may display a list 299 of the available remote devices and their corresponding alert functions.

In some embodiments, the apparatus 102 may be configured to cause display of additional information with the list of available remote devices and available alert functions. In particular, in some embodiments, the apparatus 102 may be configured to cause display of a frequency of use of each of the at least one alert function capable of being performed by each of the plurality of remote devices. For example, in some cases, the emission of color (e.g., alert function 262) of the ring 260 may occur less often than the emission of light (e.g., alert function 254) of the watch 250. Thus, in some embodiments, the device 200 may display an indication of the relative frequency of use of each of the alert functions with respect to each other. In other embodiments, the frequency of use for each alert function may be determined based on a pre-determined amount of time. Thus, the device 200 may, for example, display an average number of times per day the alert function is used.

In some embodiments, the apparatus 102 may be configured to sort the displayed list, such as by any available information regarding the remote devices and/or their corresponding alert functions. For example, the apparatus 102 may be configured to sort the displayed list by frequency of use of each alert function.

Though some embodiments of the present invention described herein provide a frequency of use of the alert function as additional information that may be useful for a user, other information is contemplated. For example, the apparatus 102 may display a length of time the alert function occurs, specific attributes about the notification (e.g., color, size, etc.), or other features.

Though some of the above described embodiments detail the apparatus 102 receiving information indicating the alert functions capable of being performed by the remote devices, in some embodiments, the apparatus 102 may be configured to perform operation of features described herein without receiving such information.

In some embodiments, in a similar manner to the example embodiments described herein, the apparatus 102 may be configured to associate input features of remote devices with input for operations of the apparatus 102. For example, a watch (e.g., watch 250 of FIG. 4) may have a button. A user may wish to associate an input of an operation performed on the device 200 with the button on the watch 250. Thus, whenever the user presses the button on the watch 250, the device 200 may receive the input (e.g., just as if the device 200 had received the input directly).

Thus, in some embodiments, the apparatus 102 may be configured to transmit a configuration signal to a plurality of remote devices. The configuration signal may instruct each of the remote devices with available inputs to perform an alert function (e.g., any alert function). This may draw the user's attention to a remote device with an available input for association. Then the apparatus 102 may receive user input indicating the user's desire to associate the input of a remote device with the input of an operation. Upon receipt of the user input, the apparatus 102 may be configured to associate the input of the remote device with the input for the operation such that input to the remote device indicates input to the apparatus 102, such as for the operation.

Embodiments of the present invention provide methods, apparatus and computer program products for associating notifications with alert functions of remote devices. Various examples of the operations performed in accordance with embodiments of the present invention will now be provided with reference to FIGS. 11-12.

FIG. 11 illustrates a flowchart according to an example method for associating notifications with alert functions of remote devices according to an example embodiment 300. The operations illustrated in and described with respect to FIG. 11 may, for example, be performed by, with the assistance of, and/or under the control of one or more of the processor 110, memory 112, communication interface 114, user interface 116, or UI control circuitry 122. Operation 302 may comprise causing transmission of an alert configuration signal to each of a plurality of remote devices, wherein the alert configuration signal instructs each of the plurality of remote devices to perform an alert function. The processor 110, and/or communication interface 114 may, for example, provide means for performing operation 302. Operation 304 may comprise receiving user input indicating the user's desire to associate a notification corresponding to an event with the alert function of at least one of the plurality of remote devices. The processor 110, user interface 116, and/or UI control circuitry 122 may, for example, provide means for performing operation 304. Operation 306 may comprise associating the notification with the alert function of the at least one of the plurality of remote devices such that the at least one of the plurality of remote devices performs the alert function when the event occurs. The processor 110 and/or communication interface 114 may, for example, provide means for performing operation 306.

FIG. 12 illustrates a flowchart according to an example method for associating notifications with alert functions of remote devices according to an example embodiment 400. The operations illustrated in and described with respect to FIG. 12 may, for example, be performed by, with the assistance of, and/or under the control of one or more of the processor 110, memory 112, communication interface 114, user interface 116, or UI control circuitry 122. Operation 402 may comprise causing transmission of a capability inquiry signal to each of the plurality of remote devices, wherein the capability inquiry signal instructs each of the plurality of remote devices to indicate the alert functions capable of being performed by the remote device. The processor 110, and/or communication interface 114, may, for example, provide means for performing operation 402. Operation 404 may comprise receiving an indication from each of the plurality of remote devices that indicates the alert functions capable of being performed by the remote device. The processor 110, user interface 116, and/or UI control circuitry 122 may, for example, provide means for performing operation 404. In some embodiments, operation 406 may comprise causing display of a list of the plurality of remote devices and at least one alert function capable of being performed by each of the plurality of remote devices. The processor 110, user interface 116, and/or UI control circuitry 122 may, for example, provide means for performing operation 406.

Operation 408 may comprise causing transmission of an alert configuration signal to each of a plurality of remote devices, wherein the alert configuration signal instructs each of the plurality of remote devices to perform an alert function. The processor 110, and/or communication interface 114 may, for example, provide means for performing operation 408. Operation 410 may comprise receiving user input indicating the user's desire to associate a notification corresponding to an event with the alert function of at least one of the plurality of remote devices. The processor 110, user interface 116, and/or UI control circuitry 122 may, for example, provide means for performing operation 410. Operation 412 may comprise associating the notification with the alert function of the at least one of the plurality of remote devices such that the at least one of the plurality of remote devices performs the alert function when the event occurs. The processor 110 and/or communication interface 114 may, for example, provide means for performing operation 412.

FIGS. 11-12 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    causing transmission of an alert configuration signal from a first device to each of a plurality of remote devices, wherein the alert configuration signal instructs each of the plurality of remote devices to perform an alert function;
    receiving user input at the first device indicating the user's desire to associate a notification corresponding to an event associated with the first device with the alert function of at least one of the plurality of remote devices; and
    associating, by a processor, the notification with the alert function of the at least one of the plurality of remote devices such that, in an instance in which the event occurs, an instruction signal is sent from the first device to the at least one of the plurality of remote devices, wherein the instruction signal instructs the at least one of the plurality of remote devices to perform the alert function, wherein the instruction signal instructs the at least one of the plurality of devices to perform the alert function in an instance in which the at least one of the plurality of devices is proximate the first device.

2. The method according to claim 1, wherein causing transmission of the alert configuration signal to each of the plurality of remote devices comprises causing transmission of the alert configuration signal to each of the plurality of remote devices in sequential order, and wherein receiving user input indicating the user's desire to associate the notification comprises receiving user input indicating the user's desire to associate the notification with the alert function currently being performed on at least one of the plurality of remote devices.

3. The method according to claim 1 further comprising:
    causing transmission of a capability inquiry signal to each of the plurality of remote devices, wherein the capability inquiry signal instructs each of the plurality of remote devices to indicate the alert functions capable of being performed by the remote device; and
    receiving an indication from each of the plurality of remote devices that indicates the alert functions capable of being performed by the remote device.

4. The method according to claim 1 further comprising causing display of a list of the plurality of remote devices and at least one alert function capable of being performed by each of the plurality of remote devices.

5. The method according to claim 4, wherein causing display of the list further comprises causing display of a frequency of use of each of the at least one alert function capable of being performed by each of the plurality of remote devices.

6. The method according to claim 1, wherein the alert function comprises at least one of: a visual alert, an audio alert, or a tangible alert.

7. The method according to claim 1, wherein the alert configuration signal instructs each of the plurality of remote devices to perform the alert function at an intensity level related to a frequency of use of the alert function of the remote device over a pre-determined period of time.

8. The method according to claim 1, wherein causing transmission of the alert configuration signal to each of the plurality of remote devices comprises causing transmission of the alert configuration signal to each of the plurality of remote devices that has an alert function that is not already associated with a notification for an event.

9. An apparatus comprising at least one processor and at least one memory including computer program code, the memory and the computer program code configured to, with the at least one processor, cause the apparatus to:
    cause transmission of an alert configuration signal from a first device to each of a plurality of remote devices, wherein the alert configuration signal instructs each of the plurality of remote devices to perform an alert function;
    receive user input at the first device indicating the user's desire to associate a notification corresponding to an event associated with the first device with the alert function of at least one of the plurality of remote devices; and
    associate the notification with the alert function of the at least one of the plurality of remote devices such that, in an instance in which the event occurs, an instruction signal is sent from the first device to the at least one of the plurality of remote devices, wherein the instruction signal instructs the at least one of the plurality of remote devices to perform the alert function, wherein the instruction signal instructs the at least one of the plurality of devices to perform the alert function in an instance in which the at least one of the plurality of devices is proximate the first device.

10. The apparatus of claim 9, wherein the at least one memory and the computer program code are further configured to, with the at least one processor, cause the apparatus to cause transmission of the alert configuration signal to each of the plurality of remote devices by causing transmission of the alert configuration signal to each of the plurality of remote devices in sequential order, and wherein the at least one memory and the computer program code are further configured to, with the at least one processor, cause the apparatus to receive user input indicating the user's desire to associate the notification by receiving user input indicating the user's desire to associate the notification with the alert function currently being performed on at least one of the plurality of remote devices.

11. The apparatus of claim 9, wherein the at least one memory and the computer program code are further configured to, with the at least one processor, cause the apparatus to:
cause transmission of a capability inquiry signal to each of the plurality of remote devices, wherein the capability inquiry signal instructs each of the plurality of remote devices to indicate the alert functions capable of being performed by the remote device; and
receive an indication from each of the plurality of remote devices that indicates the alert functions capable of being performed by the remote device.

12. The apparatus of claim 9, wherein the at least one memory and the computer program code are further configured to, with the at least one processor, cause the apparatus to cause display of a list of the plurality of remote devices and at least one alert function capable of being performed by each of the plurality of remote devices.

13. The apparatus of claim 12, wherein the at least one memory and the computer program code are further configured to, with the at least one processor, cause the apparatus to cause display of the list by further causing display of a frequency of use of each of the at least one alert function capable of being performed by each of the plurality of remote devices.

14. The apparatus of claim 9, wherein the alert function comprises at least one of: a visual alert, an audio alert, or a tangible alert.

15. The apparatus of claim 9, wherein the alert configuration signal instructs each of the plurality of remote devices to perform the alert function at an intensity level related to a frequency of use of the alert function of the remote device over a pre-determined period of time.

16. The apparatus of claim 9, wherein the at least one memory and the computer program code are further configured to, with the at least one processor, cause the apparatus to cause transmission of the alert configuration signal to each of the plurality of remote devices by causing transmission of the alert configuration signal to each of the plurality of remote devices that has an alert function that is not already associated with a notification for an event.

17. Computer program product comprising a non-transitory computer readable medium having program code portions stored thereon, the program code portions being a computer readable medium and configured when said program product is run on a computer or network device, to:
cause transmission of an alert configuration signal from a first device to each of a plurality of remote devices, wherein the alert configuration signal instructs each of the plurality of remote devices to perform an alert function;
receive user input at the first device indicating the user's desire to associate a notification corresponding to an event associated with the first device with the alert function of at least one of the plurality of remote devices; and
associate the notification with the alert function of the at least one of the plurality of remote devices such that, in an instance in which the event occurs, an instruction signal is sent from the first device to the at least one of the plurality of remote devices, wherein the instruction signal instructs the at least one of the plurality of remote devices to perform the alert function, wherein the instruction signal instructs the at least one of the plurality of devices to perform the alert function in an instance in which the at least on of the plurality of devices is proximate the first device.

18. The computer program product of claim 17, wherein the program code portions are further configured when said program product is run on a computer or network device, to cause transmission of the alert configuration signal to each of the plurality of remote devices by causing transmission of the alert configuration signal to each of the plurality of remote devices in sequential order, and wherein the program code portions are further configured when said program product is run on a computer or network device, to receive user input indicating the user's desire to associate the notification by receiving user input indicating the user's desire to associate the notification with the alert function currently being performed on at least one of the plurality of remote devices.

19. The computer program product of claim 17, wherein the program code portions are further configured when said program product is run on a computer or network device, to:
cause transmission of a capability inquiry signal to each of the plurality of remote devices, wherein the capability inquiry signal instructs each of the plurality of remote devices to indicate the alert functions capable of being performed by the remote device; and
receive an indication from each of the plurality of remote devices that indicates the alert functions capable of being performed by the remote device.

20. The computer program product of claim 17, wherein the program code portions are further configured when said program product is run on a computer or network device, to cause display of a list of the plurality of remote devices and at least one alert function capable of being performed by each of the plurality of remote devices.

21. The method of claim 1, wherein the plurality of remote devices comprises at least one of a watch, ring, pennant, personal digital assistant, or music player.

22. The apparatus of claim 9, wherein the plurality of remote devices comprises at least one of a watch, ring, pennant, personal digital assistant, or music player.

23. The computer program product of claim 17, wherein the plurality of remote devices comprises at least one of a watch, ring, pennant, personal digital assistant, or music player.

* * * * *